United States Patent
Woo et al.

(10) Patent No.: US 12,320,402 B2
(45) Date of Patent: Jun. 3, 2025

(54) MOUNTING BUSHING

(71) Applicants: HYUNDAI MOTOR COMPANY, Seoul (KR); KIA CORPORATION, Seoul (KR); DAEHEUNG R&T CO., LTD., Gimhae-si (KR)

(72) Inventors: Yong Jae Woo, Hwaseong-si (KR); Se Young Kim, Gimhae-si (KR); Jin Wook Park, Busan (KR)

(73) Assignees: HYUNDAI MOTOR COMPANY, Seoul (KR); KIA CORPORATION, Seoul (KR); DAEHEUNG R&TCO., LTD., Gimhae-si (KR)

( * ) Notice: Subject to any disclaimer, the term of this patent is extended or adjusted under 35 U.S.C. 154(b) by 517 days.

(21) Appl. No.: 17/695,511

(22) Filed: Mar. 15, 2022

(65) Prior Publication Data

US 2023/0120628 A1   Apr. 20, 2023

(30) Foreign Application Priority Data

Oct. 15, 2021   (KR) .......................... 10-2021-0137457

(51) Int. Cl.
*F16F 1/38* (2006.01)

(52) U.S. Cl.
CPC .................................. *F16F 1/3835* (2013.01)

(58) Field of Classification Search
CPC .......... F16F 1/3835; F16F 1/3863; F16F 1/38; F16F 2224/0225; F16F 2228/006; F16F 2228/007; F16F 2230/0076; F16C 11/045; F16C 11/083; F16C 11/0676; F16C 17/02; F16C 27/063; F16C 27/06; F16C 33/106; F16C 2223/30; F16C 2326/05; F16C 2326/24

USPC .......................................................... 267/141
See application file for complete search history.

(56) References Cited

U.S. PATENT DOCUMENTS

| 4,667,943 | A | * | 5/1987 | Izumi | ..................... B60G 3/225 403/228 |
| 4,809,960 | A | * | 3/1989 | Kakimoto | ................. F16F 1/38 403/228 |
| 5,261,748 | A | * | 11/1993 | Kameda | .................... B60G 7/02 267/141 |
| 2011/0193278 | A1 | * | 8/2011 | Kobori | .................. F16F 1/3735 267/141.1 |
| 2013/0028543 | A1 | * | 1/2013 | Kang | ................. B60G 21/0551 384/13 |

(Continued)

FOREIGN PATENT DOCUMENTS

| KR | 20110132743 A | * | 12/2011 |
| KR | 20170142405 A | | 12/2017 |

*Primary Examiner* — Robert A. Siconolfi
*Assistant Examiner* — San M Aung
(74) *Attorney, Agent, or Firm* — Lempia Summerfield Katz LLC

(57) ABSTRACT

A mounting bushing for a vehicle satisfies durability requirements as well as performance, such as ride comfort, handling, and noise, vibration, and harshness (NVH) reduction. The mounting bushing includes an inner pipe, an elastic portion surrounding an external side of the inner pipe, an intermediate pipe surrounding an external side of the elastic portion and having a cutout provided in an axial direction, and an outer pipe surrounding an external side of the intermediate pipe. The elastic portion is formed of a material having a dynamic ratio lower than a dynamic ratio of a rubber material.

11 Claims, 4 Drawing Sheets

(56) References Cited

U.S. PATENT DOCUMENTS

| | | | |
|---|---|---|---|
| 2013/0028547 A1* | 1/2013 | Jang | B60G 21/0551 |
| | | | 384/215 |
| 2013/0043370 A1* | 2/2013 | Kim | F16F 13/1463 |
| | | | 248/638 |
| 2019/0128320 A1* | 5/2019 | Cox | F16C 33/106 |
| 2020/0263731 A1* | 8/2020 | Ito | F16F 9/535 |

* cited by examiner

MOUNTING BUSHING

CROSS-REFERENCE TO RELATED APPLICATION

This application claims under 35 USC 119 (a) the benefit of and priority to Korean Patent Application No. 10-2021-0137457 filed on Oct. 15, 2021 in the Korean Intellectual Property Office, the entire disclosure of which is incorporated herein by reference for all purposes.

TECHNICAL FIELD

The present disclosure relates to a mounting bushing coupled, for example, between a vehicle body and a subframe.

BACKGROUND

In general, a subframe, also known as a suspension member, is a part to which a suspension or a powertrain is fixed, and which is attached to a frame or a vehicle body to form a vehicle's skeleton. Generally, a subframe is mounted on the vehicle body with a bushing interposed therebetween to prevent vibrations or noise from being transmitted.

Such a bushing has a dual nature of having a strong structure for load transmission and absorbing vibrations from the road surface. Moreover, the bushing of the subframe has a substantial influence on suspension performance, for example, ride comfort and handling performance.

In detail, the bushing of the subframe should be able to play a role in improving riding comfort and vibration damping by softening the front and rear and upper and lower sides, and in increasing lateral rigidity and improving handling performance by making the left and right sides harder or stiffer.

In the related art, bushings use rubber to improve ride comfort, handling performance, and noise, vibration, harshness (NVH) reduction performance due its ability to change in shape, but there is a limit. However, performance cannot be maximized in a situation in which ride comfort and handling performance and NVH reduction performance are traded off.

In such a situation, where different performance characteristics of the bushing conflict with each other, it is difficult to adequately satisfy these performance requirements. Furthermore, durability is important. Thus, in order to satisfy all these conditions, it is necessary to optimize not only the structure but also the material of the bushings.

The above descriptions regarding background technologies have been made only to enhance understanding of the background of the present disclosure. Therefore, the above descriptions are not to be deemed by those having ordinary skill in the art to correspond to already-known prior art, and should not be taken as acknowledgment that this information forms any part of the prior art.

SUMMARY

An aspect of the present disclosure is to provide a mounting bushing for a vehicle in which durability as well as performance, such as ride comfort, handling, and NVH reduction, may be all satisfied, improved, or optimized.

According to an aspect of the present disclosure, a mounting bushing includes: an inner pipe; an elastic portion surrounding an external side of the inner pipe; an intermediate pipe surrounding an external side of the elastic portion and having a cutout provided in an axial direction; and an outer pipe surrounding an external side of the intermediate pipe. The elastic portion is formed of a material having a dynamic ratio lower than a dynamic ratio of a rubber material.

The mounting bushing may further include: a first ring member formed of an elastic material and attached to one end of the intermediate pipe; and a second ring member formed of an elastic material and attached to an end of the outer pipe to be adjacent to the other end of the intermediate pipe.

The elastic portion may include a urethane material.

A performance of the elastic portion may be controlled by adjusting a density by changing a mixing ratio of a composition of a material.

The elastic portion may be configured to be selectively divided into halves of a pair.

A density of a material of one half, among the halves of the pair, may be different from a density of a material of the other half of the pair.

An outer peripheral surface of the inner pipe may be provided with at least one bulge protruding radially. An inner peripheral surface of the elastic portion may be provided with a bulge groove having a radial concave shape to at least partially receive the bulge.

The bulge may be provided as a plurality of bulges. A pair of bulges may be configured symmetrically with respect to a through-hole of the inner pipe. Alternatively, one bulge may be spaced apart from the other bulge by a predetermined distance in an axial direction of the inner pipe. The bulge groove may have a shape and arrangement corresponding to the bulge and may be provided in numbers corresponding to the number of the bulges.

In the through-hole of the inner pipe, a concave groove may be provided to be depressed in the same direction as a protruding direction of the bulge.

The intermediate pipe may be configured to have an open cross-section to be capable of opening.

One end of the intermediate pipe may be provided with a flange bent to extend radially outward. The flange may be in contact with the outer pipe.

The first ring member may be configured to have an open cross-section.

An end of the outer pipe to which the second ring member is adhered may be swaged after press-fitting of the intermediate pipe, to provide a reduced diameter portion.

BRIEF DESCRIPTION OF DRAWINGS

The above and other aspects, features, and advantages of the present inventive concept should be more clearly understood from the following detailed description, taken in conjunction with the accompanying drawings, in which.

DETAILED DESCRIPTION

Figure 1:
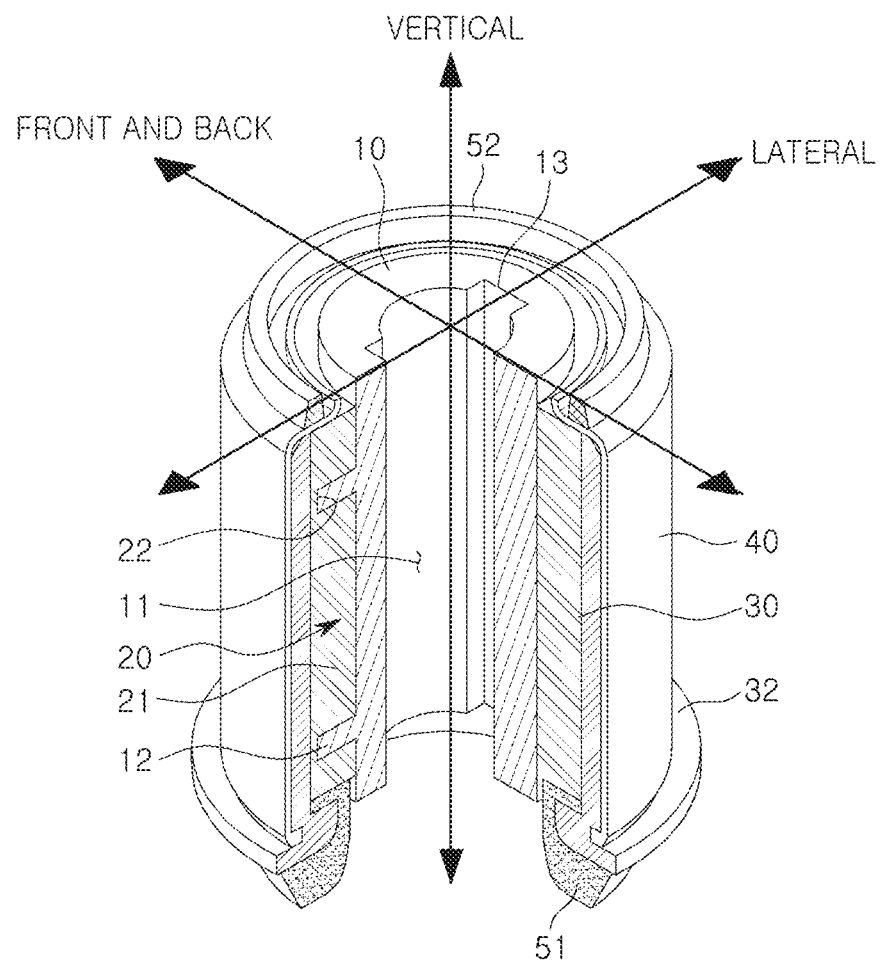
FIG. 1 is a partially cutaway perspective view illustrating a mounting bushing according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein should be apparent to one of ordinary skill in the art. The sequences of operations described herein are merely examples and are not limited to those set forth herein. The sequence of operations may be changed as should be apparent to one of ordinary skill in the art, with the exception of operations necessarily occurring in a certain order. Also, descriptions of functions and constructions that would be well known to one of ordinary skill in the art have been omitted for increased clarity and conciseness.

The features described herein may be embodied in different forms and are not to be construed as being limited to the examples described herein. Rather, the examples described herein have been provided to make this disclosure thorough and complete, and to fully convey the scope of the disclosure to one of ordinary skill in the art.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may, in one example, also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term. "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for only describing various examples and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. When a component, device, element, or the like of the present disclosure is described as having a purpose or performing an operation, function, or the like, the component, device, or element should be considered herein as being "configured to" meet that purpose or perform that operation or function.

Due to manufacturing techniques and/or tolerances, variations of the shapes illustrated in the drawings may occur. Thus, the examples described herein are not limited to the specific shapes illustrated in the drawings but instead are intended to include changes in shape occurring during manufacturing.

The features of the examples described herein may be combined in various manners as should be apparent after gaining an understanding of the disclosure of this application. Further, although the examples described herein have a variety of configurations, other configurations are possible as should be apparent after gaining an understanding of the disclosure of this application.

The drawings may not be to scale, and the relative sizes, proportions, and depiction of elements in the drawings may be exaggerated for clarity, illustration, and convenience.

In the present specification, for convenience of explanation, the mounting bushing of the present disclosure is mainly illustrated and described with reference to an example in which the mounting bushing is installed in a vehicle, for example, coupled between the vehicle body and the subframe. However, the application example is not necessarily limited thereto.

In addition, the terms "vertical", "upper", "lower", "front and back", "lateral", and the like used in relation to the direction are defined based on the vehicle body, for example, the installation object.

Figure 2:
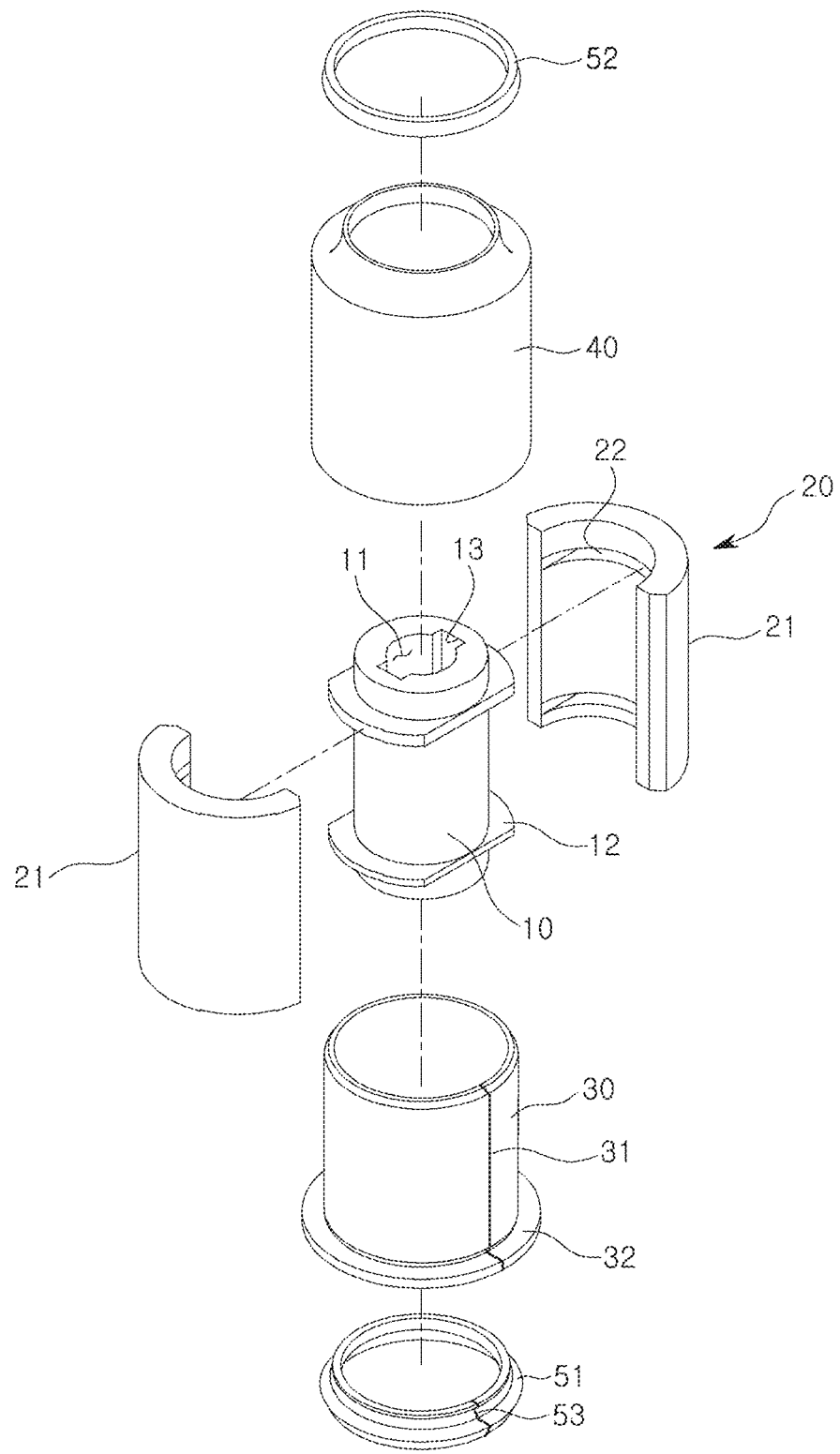
FIG. 2 is an exploded perspective view illustrating a mounting bushing according to an embodiment.

FIG. 1 is a partially cutaway perspective view illustrating a mounting bushing according to an embodiment. FIG. 2 is an exploded perspective view illustrating a mounting bushing according to an embodiment.

As illustrated in FIGS. 1 and 2, a mounting bushing according to an embodiment may include an inner pipe 10, an elastic portion 20, an intermediate pipe 30, and an outer pipe 40. The term "pipe" as used herein may refer to an element of the mounting bushing that has or is a tubular or tube-like shaped body.

The inner pipe 10 is a member that is straight vertically to have a linear axis, and may be formed of, for example, a metal material such as aluminum or steel. The inner pipe may be penetrated by, for example, a fastening member such as a bolt and be coupled to a vehicle body. To this end, a through-hole 11 may be formed in the inner pipe by penetrating through the inner pipe vertically in the axial direction.

In addition, the outer peripheral surface of the inner pipe 10 may be provided with at least one bulge 12 formed to protrude radially. For example, as illustrated more clearly in FIG. 2, one pair of bulges 12 may be formed symmetrically with respect to the through-hole 11. In addition, the other pair of bulges may be formed at a predetermined distance from the one pair of bulges in the axial direction of the inner pipe.

As the bulge 12 is formed on the inner pipe 10, the performance of reducing noise, vibration, and harshness (NVH) while increasing the rigidity of the bushing itself may be improved. As the inner pipe is formed of a metal material, the buckling performance of the inner pipe may be improved, and extrusion molding is also possible. Therefore, there is an advantage of reducing costs.

In this case, for example, when the mounting bushing according to an embodiment is coupled between the vehicle body and the subframe, it may be advantageous to have relatively low vertical rigidity to improve performance in reducing NVH by insulating vibrations of a lower portion of the vehicle body. It may be advantageous to have relatively high front-back rigidity and lateral rigidity to improve the handling performance of the vehicle.

In the mounting bushing according to an embodiment, lateral rigidity of the mounting bushing may be controlled by adjusting the radially protruding length of the bulge 12. In this case, the protrusion direction of the bulge may coincide with the width direction of the vehicle body. When the mounting bushing is mounted in the vehicle body, to identify the same, a concave groove 13 may be formed to be depressed in the same direction as the protruding direction of the bulge 12, in the through-hole 11 of the inner pipe 10.

Moreover, in the mounting bushing according to an embodiment, when the plurality of bulges 12 are formed at a predetermined distance in the axial direction of the inner pipe 10, the distance at which the bulges are spaced apart from each other in the axial direction may be adjusted, and thus, the vertical rigidity may be controlled. In this case, the vertical direction of the bushing may coincide with the height direction of the vehicle body.

As described above, in the case of the mounting bushing according to an embodiment, the shape of the inner pipe 10 may be tuned, and lateral rigidity, according to, for example, the input load of the subframe may be increased. Thus, the handling performance of the vehicle may be improved.

The elastic portion 20 is a tubular member disposed to surround the external side of the inner pipe 10. This elastic portion 20 may be formed of an elastic material, and may be formed to include, for example, a urethane material having a dynamic ratio lower than that of a rubber material of the related art. In more detail, the elastic portion may be formed of urethane foam. It is known that the dynamic ratio of urethane is 35-45% lower than that of rubber.

The dynamic ratio may be defined as the ratio of dynamic stiffness to static stiffness. Since the dynamic ratio of urethane is lower than that of a rubber material, in the mounting bushing according to an embodiment of the present disclosure, dynamic characteristics (e.g., stiffness) are kept low to improve riding comfort and NVH reduction performance using only the material.

In the case of a related art bushing using rubber, even when the characteristics in any one of the three directions (front-back/lateral/vertical directions) are adjusted, the adjustment directly affects the characteristics in all three directions. Accordingly, it is impossible that the characteristics in a required direction are individually increased or decreased.

However, in the case of employing, for example, urethane, which has a dynamic ratio lower than that of the rubber material, while basically maintaining the dynamic properties to be relatively low, other properties may be increased by applying shapes, dimensions or densities differently.

For example, as illustrated more clearly in FIG. 2, in the mounting bushing according to an embodiment, the elastic portion 20 may be optionally formed to be divided into halves 21 of a pair. The pair of halves may be formed symmetrically, and may be separated vertically, for example, in parallel to the axial direction of the inner pipe 10.

In addition, a bulge groove 22 formed to be radially concave may be provided in the inner circumferential surface of the elastic portion 20, to at least partially receive the bulge 12 of the inner pipe 10. The bulge groove may have a shape and arrangement corresponding to those of the bulge of the inner pipe and may be provided in the number corresponding to the number of the bulges.

Accordingly, a pair of bulge grooves 22 may also be formed symmetrically with respect to the through-hole 11 of the inner pipe 10. The other pair of bulge grooves may be formed to be spaced apart from the one pair of bulge grooves by a predetermined distance in the axial direction of the inner pipe.

As such, the bulge 12 of the inner pipe 10 is shape-fitted to the bulge groove 22 of the elastic portion 20, thereby having an increased compression cross-sectional area. In addition, vibrations and shocks transmitted to the elastic portion 20 from the outside thereof may be distributed to a relatively wider area. Thus, the bushing may have rigidity and durability that may withstand higher vibrations and shocks.

In addition, the bulge groove 22 of the elastic portion 20 elastically supports the bulge 12 of the inner pipe 10, thereby constraining the vertical relative motion between the inner pipe and the elastic portion to increase the durability of the mounting bushing. In addition, when the mounting bushing according to an embodiment is coupled between, for example, a vehicle body and a subframe, the performance of reducing NVH by insulating vibrations of a lower portion of the vehicle body may be improved.

Figure 3:
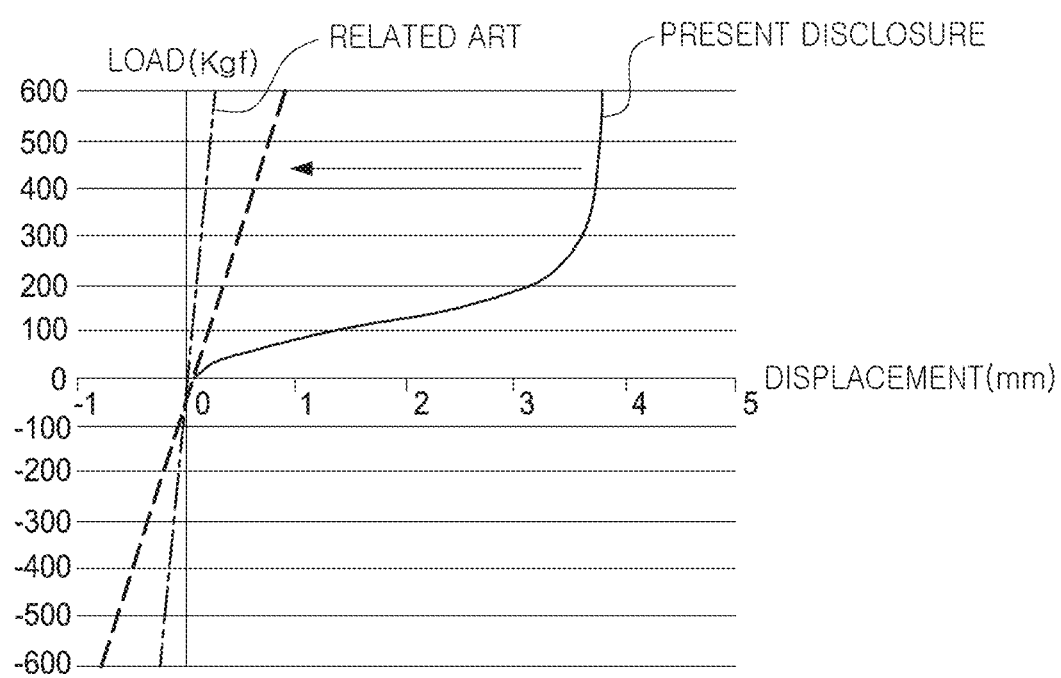
FIG. 3 is a graph illustrating that lateral rigidity of a mounting bushing according to an embodiment may be changed by tuning the performance of an elastic portion.

FIG. 3 is a graph illustrating that the lateral rigidity of the mounting bushing according to an embodiment may be changed by tuning the performance of the elastic portion.

For performance tuning, for example, the thickness (radial dimension or thickness) of the elastic portion 20 may be changed. In the case in which the thickness of the elastic portion is increased, the compression amount of the elastic portion may be increased, but the dynamic ratio may also be increased, deteriorating performance in isolating vibrations.

In addition, the density of the urethane for the entire elastic portion 20 may be adjusted according to required properties. In detail, the performance of the elastic portion 20 may be controlled by changing the mixing ratio of the composition of the material of the elastic portion to adjust the density.

Alternatively, the density of urethane in one half of the pair of halves 21 constituting the elastic portion 20 may be adjusted to be different from the density of urethane in the other half. In the case of urethane, as the density increases, the dynamic ratio may be increased and the vibration insulation performance may be deteriorated.

In this manner, by employing urethane in the elastic portion 20 keeping the dynamic properties low and by varying the shape, dimension, or density to adjust other properties, the performance tuning of the elastic portion may be adjusted from the solid line to the dotted line as illustrated in FIG. 3. The dashed-dotted line in FIG. 3 is a characteristic graph of a bushing using rubber of the related art. It can also be confirmed that the characteristic values of rubber and urethane may become similar.

Referring back to FIGS. 1 and 2, the intermediate pipe 30 is disposed to surround the external side of the elastic portion 20. The intermediate pipe 30 has a cutout 31 in the axial direction to have an open cross-section. This intermediate pipe 30 may be formed of a material such as plastic, for example.

When inserting the assembly of the elastic portion 20 and the inner pipe 10 into the intermediate pipe 30, the intermediate pipe may be opened by elasticity in the cutout 31. Thus, the intermediate pipe 30, the elastic portion 20, and the inner pipe 10 may be easily assembled.

Furthermore, after inserting the assembly of the elastic portion 20 and the inner pipe 10 into the intermediate pipe 30, the elastic portion is pressed by the elasticity of the intermediate pipe to maintain the coupling and increase the durability of the bushing.

A flange 32 bent to extend radially outward may be formed on one end (e.g., a lower end) of the intermediate pipe 30. The cutout 31 is also formed in the flange 32.

The outer pipe 40 is disposed to surround an external side of the intermediate pipe 30. The outer pipe may be formed of, for example, a metal material such as aluminum or steel, such that the shape of the bushing may be firmly maintained.

The intermediate pipe, for example, an assembly of the intermediate pipe 30, the elastic portion 20 and the inner pipe 10 may be press-fitted into the outer pipe.

The outer pipe 40 is brought in contact with the flange 32 of the intermediate pipe 30 and is brought into close contact with the intermediate pipe.

As such, the mounting bushing according to an embodiment uses: the inner pipe 10, which has the bulge 12, the shape of which may be tuned by changing the size or arrangement; the elastic portion 20 formed of a urethane material in which a density may be changed or be configured partially differently; and the intermediate pipe 30 formed of a plastic material that may be cut and opened or pressed. Thereby, the mounting bushing individually satisfies the required characteristics in three directions (front-back/lateral/vertical directions).

Therefore, in a vehicle to which the mounting bushing according to an embodiment of the present disclosure is applied, the bushing exhibits sufficient durability and effectively absorbs shock and noise, thereby improving performance of ride comfort, handling, and NVH reduction.

The mounting bushing according to an embodiment may further include a first ring member 51 attached to one end of the intermediate pipe 30 and may include a second ring member 52 attached to an end of the outer pipe 40 to be adjacent to the other end of the intermediate pipe.

The first ring member 51 and the second ring member 52 may be formed of, for example, an elastic material such as rubber. The first ring member may be vulcanized to the inner surface and the flange 32 of the intermediate pipe 30. The second ring member may be vulcanized to the outer peripheral surface of the outer pipe 40. These ring members may act as means for controlling the vertical rigidity of the bushing.

The first ring member 51 may be formed to have an open cross-section by having a cutout 53 corresponding to the cutout 31 of the intermediate pipe 30. After the intermediate pipe 30 is press-fitted into the outer pipe 40, the first ring member is pressed by a pressing force. The force that the first ring member repulses externally (i.e., an outward force exerted on the first ring member) is equally applied to the inner surface of the outer pipe. Thereby durability of the bushing may be increased.

In addition, the end of the outer pipe 40 to which the second ring member 52 is adhered may be swaged after the press-fitting of the intermediate pipe 30, thereby having an approximately truncated cone-shaped reduced diameter portion. The second ring member 52 may be seated and adhered to the reduced diameter portion.

Accordingly, in the mounting bushing according to an embodiment, vertical rigidity is reduced through the first ring member 51 and/or the second ring member 52 in the case in which a load is input vertically, i.e. axially. When the mounting bushing according to an embodiment is coupled between, for example, a vehicle body and a subframe, vibrations of a lower portion of the vehicle body may be insulated, thereby improving NVH reduction performance of the vehicle.

In addition, the first ring member 51 and/or the second ring member 52 may restrain the relative motion in the vertical direction between the subframe and the mounting bushing, thereby increasing the durability of the mounting bushing.

Accordingly, the mounting bushing according to an embodiment may individually control the rigidity in all three directions, i.e., front-back/lateral/vertical directions, according to the input load. Furthermore, since the vertical rigidity may be lowered and the front and back rigidity and the lateral rigidity may be secured (e.g., maintained or achieved) as strong as a solid level, the ride comfort, handling, and NVH reduction performance of the vehicle may be simultaneously improved.

Figure 4:
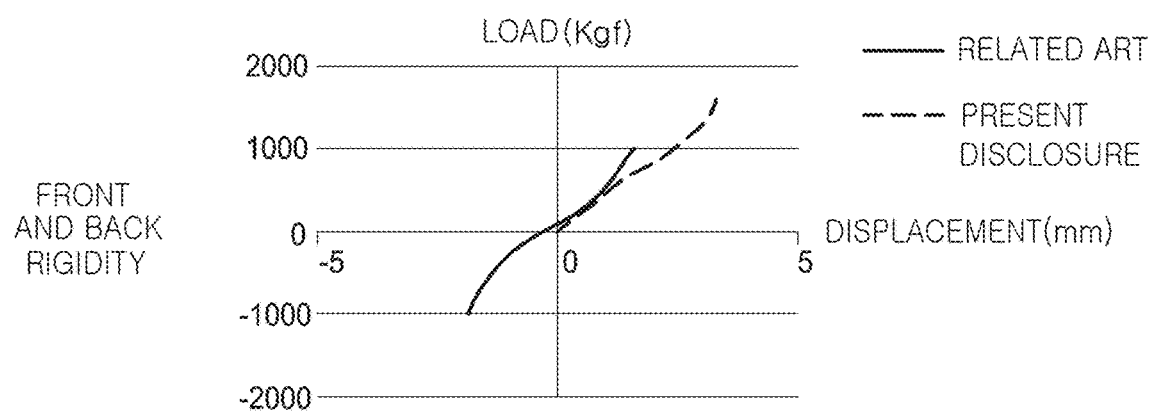
FIG. 4 is a graph illustrating the comparison of characteristic values of a related art rubber bushing and a bushing according to an embodiment of the present disclosure.
Figure 4:
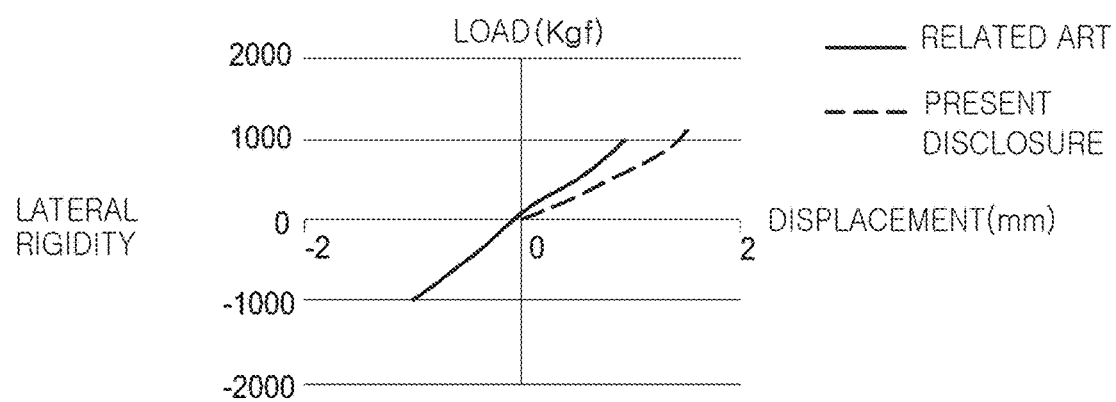
Figure 4:
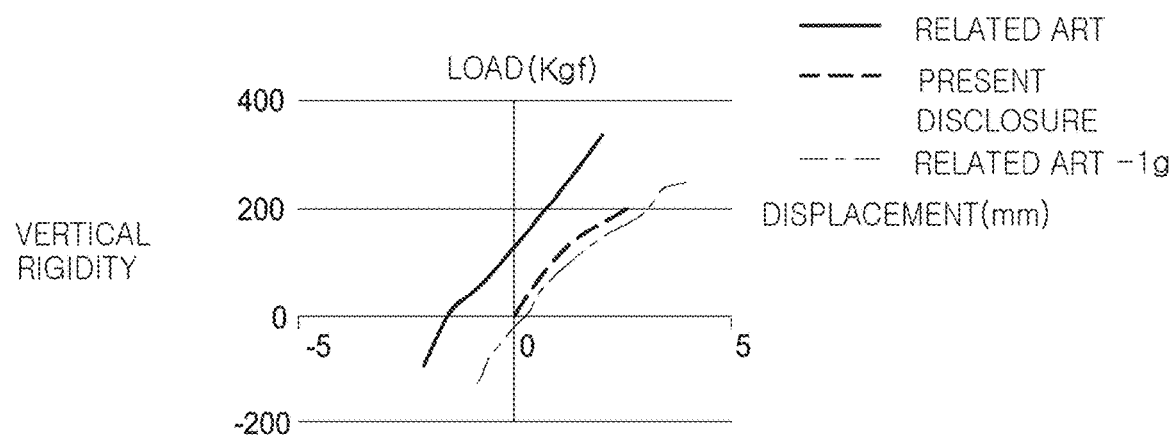

FIG. 4 provides graphs illustrating a comparison of characteristic values of a rubber bushing of the related art and the mounting bushing of the present disclosure. These graphs are obtained by model analysis for a case in which the related art rubber bushing and the mounting bushing of the present disclosure are coupled to the front, between, for example, the vehicle body and the subframe.

In the mounting bushing according to an embodiment of the present disclosure, the material and shape of elements constituting the bushing may be changed. In detail, the material of the elastic portion may be changed to urethane and urethane having a different density may be applied. A plastic material may be applied to the intermediate pipe and a metal material may be applied to the inner pipe and the outer pipe. Rigidity is thereby controlled, a shape is thereby maintained, and durability is thereby improved.

As illustrated in FIG. 4, it can be confirmed that characteristic values of the bushing using the related art rubber and the mounting bushing using the urethane of the present disclosure become similar. The rightmost characteristic graph in the graph illustrating vertical rigidity represents the characteristic values of the mounting bushing according to an embodiment of the present disclosure when 1 g of urethane is subtracted.

As a result, it can be seen that, as the weight of urethane is added to the mounting bushing of the present disclosure, the mounting bushing exhibits the same characteristics as that of the rubber bushing of the related art.

In addition, for example, according to the durability analysis, when a load is applied, it can be confirmed that the mounting bushing according to an embodiment of the present disclosure may withstand nearly three times more stress than the related art bushing using rubber.

Table 1 below illustrates an example of actual characteristic values for the related art bushing using rubber and the mounting bushing using the urethane of the present disclosure.

TABLE 1

| | Specification | | Solid | Rubber | Urethane 1 (NVH reduction) | Urethane 2 (ride comfort/handling) |
|---|---|---|---|---|---|---|
| Bushing Characteristics | Static Characteristics (kgf/mm) | vertical | — | 46 | 48 | 73 |
| | | Front and back | — | 167 | 119 | 196 |
| | | Lateral | — | 482 | 621 | 948 |
| | Dynamic characteristics (@100 Hz) | Vertical | — | 97 | 52 | 98 |
| | | Dynamic ratio | 2.1 | 1.1 | | 1.3 |

TABLE 1-continued

| Specification | | Solid | Rubber | Urethane 1 (NVH reduction) | Urethane 2 (ride comfort/ handling) |
|---|---|---|---|---|---|
| Vehicle performance(Ranking) | NVH reduction | 4 | 2 | 1 | 3 |
| | Ride comfort | 4 | 2 | 1 | 3 |
| | Handling | 1 | 4 | 3 | 2 |

As illustrated in Table 1, in the case of a rubber bushing of the related art, if the lateral static properties are increased by as much as urethane (about 600 to 900 kgf/mm level), since the vertical static and vertical dynamic properties are increased together, the handling performance may be improved, but ride comfort and NVH reduction performance may deteriorate.

Similarly, in the case of lowering the vertical dynamic characteristic, since the lateral static characteristic is also lowered, the handling performance is deteriorated.

Meanwhile, in the mounting bushing using the urethane of the present disclosure, the required characteristics in three directions (front-back/lateral/vertical directions) may be individually satisfied. In detail, the characteristics in the required direction may be individually increased or decreased while leaving the characteristics in the other direction unchanged, i.e., as is.

As described above, according to an embodiment of the present disclosure, the effect of significantly reducing the costs may be obtained while satisfying the target performance of the mounting bushing.

While this disclosure includes specific examples, it should be apparent to one of ordinary skill in the art that various changes in form and detail may be made to these examples without departing from the spirit and scope of the claims and their equivalents. The examples described herein are to be considered in a descriptive sense only, not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined, not by the detailed description, but by the claims and their equivalents. All variations within the scope of the claims and their equivalents are to be construed as being included in the disclosure.

What is claimed is:

1. A mounting bushing comprising:
an inner pipe;
an elastic portion surrounding an external side of the inner pipe;
an intermediate pipe surrounding an external side of the elastic portion and having a cutout provided in an axial direction; and
an outer pipe surrounding an external side of the intermediate pipe,
wherein the elastic portion is formed of a material having a dynamic ratio lower than a dynamic ratio of a rubber material,
wherein the elastic portion is divided into halves of a pair, the halves of the pair being separated parallel to the axial direction of the inner pipe, and
wherein a density of a material of one half, among the halves of the pair, is different from a density of a material of the other half, among the halves of the pair.

2. The mounting bushing of claim 1,
wherein an outer peripheral surface of the inner pipe is provided with at least one bulge protruding radially, and
wherein an inner peripheral surface of the elastic portion is provided with a bulge groove having a radial concave shape to at least partially receive the bulge.

3. The mounting bushing of claim 2,
wherein the bulge is provided as a plurality of bulges,
wherein a pair of bulges are configured symmetrically with respect to a through-hole of the inner pipe, or one bulge is spaced apart from the other bulge by a predetermined distance in an axial direction of the inner pipe, and
wherein the bulge groove has a shape and arrangement corresponding to the bulge and is provided in numbers corresponding to the number of the bulges.

4. The mounting bushing of claim 2,
wherein in the through-hole of the inner pipe, a concave groove is provided to be depressed in the same direction as a protruding direction of the bulge.

5. The mounting bushing of claim 1,
wherein the intermediate pipe is configured to have an open cross-section to be capable of opening.

6. The mounting bushing of claim 5,
wherein one end of the intermediate pipe is provided with a flange bent to extend radially outwardly and wherein the flange is in contact with the outer pipe.

7. The mounting bushing of claim 1, further comprising:
a first ring member formed of an elastic material and attached to one end of the intermediate pipe; and
a second ring member formed of an elastic material and attached to an end of the outer pipe to be adjacent to the other end of the intermediate pipe.

8. The mounting bushing of claim 7,
wherein the first ring member is configured to have an open cross-section.

9. The mounting bushing of claim 7,
wherein an end of the outer pipe to which the second ring member is adhered is swaged after press-fitting of the intermediate pipe to provide a reduced diameter portion.

10. The mounting bushing of claim 1, wherein the elastic portion includes a urethane material.

11. The mounting bushing of claim 10, wherein a performance of the elastic portion is controlled by adjusting a density by changing a mixing ratio of a composition of the urethane material.

* * * * *